United States Patent
Schweid (10) Patent No.: US 9,631,977 B2
(45) Date of Patent: Apr. 25, 2017

(54) DEVICE CALIBRATION USING AUGMENTED DATA WITH HADAMARD VARIATION

(71) Applicant: Xerox Corporation, Norwalk, CT (US)

(72) Inventor: Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 625 days.

(21) Appl. No.: 14/109,566

(22) Filed: Dec. 17, 2013

(65) Prior Publication Data

US 2015/0168218 A1 Jun. 18, 2015

(51) Int. Cl.
| | | |
|---|---|---|
| G01C 19/00 | (2013.01) | |
| G01C 25/00 | (2006.01) | |
| G01D 18/00 | (2006.01) | |
| G01F 25/00 | (2006.01) | |
| G06F 19/00 | (2011.01) | |
| G01J 3/28 | (2006.01) | |
| G01J 3/46 | (2006.01) | |
| G01J 3/52 | (2006.01) | |

(52) U.S. Cl.
CPC ............ *G01J 3/2846* (2013.01); *G01J 3/462* (2013.01); *G01J 3/524* (2013.01)

(58) Field of Classification Search
CPC ........... G01J 3/2846; G01J 3/462; G01J 3/524
USPC ....................................................... 702/104
See application file for complete search history.

(56) References Cited

U.S. PATENT DOCUMENTS

| | | | | |
|---|---|---|---|---|
| 4,941,039 A * | 7/1990 | E'Errico | .............. | H04N 1/6019 358/518 |
| 6,269,184 B1 * | 7/2001 | Spaulding | .............. | H04N 1/622 345/604 |
| 6,538,770 B1 * | 3/2003 | Mestha | .............. | H04N 1/00002 358/1.9 |
| 8,340,937 B2 | 12/2012 | Skinner et al. | | |
| 8,390,882 B2 * | 3/2013 | Dalal | ........................ | G01J 3/46 358/1.9 |
| 2003/0050768 A1 * | 3/2003 | Mestha | ...................... | G01J 3/46 702/196 |
| 2003/0055611 A1 * | 3/2003 | Mestha | ...................... | G01J 3/28 702/196 |
| 2003/0169189 A1 * | 9/2003 | Bretl | .................... | H03M 7/3082 341/50 |
| 2005/0243312 A1 * | 11/2005 | Geshwind | ................. | G01J 3/02 356/310 |
| 2009/0009766 A1 | 1/2009 | Bonino et al. | | |

(Continued)

*Primary Examiner* — David Gray
*Assistant Examiner* — Geoffrey T Evans (57) ABSTRACT

A method, non-transitory computer readable medium, and apparatus for calibrating a device using augmented data are disclosed. For example, the method measures k spectral values of each patch for a first plurality of patches generated by the device and a second plurality of patches generated by the reference device, creates a first augmented data set by selecting a delta ($\delta$), wherein the first augmented data set comprises the $\delta$ applied k times to each one of the k spectral values of each one of the first plurality of patches, initializes initializing a function to create a second augmented data set for the reference device, solves the function to obtain a matrix of calibration values of the device that is based upon the first augmented data set and the second augmented data set and calibrates the device using the matrix of calibration values.

20 Claims, 3 Drawing Sheets

(56) References Cited

U.S. PATENT DOCUMENTS

| | | | | |
|---|---|---|---|---|
| 2009/0174726 A1* | 7/2009 | Ollivier | ............... | H04N 1/6011 |
| | | | | 345/600 |
| 2011/0194862 A1* | 8/2011 | Shindo | ................ | H04N 1/6033 |
| | | | | 399/27 |
| 2011/0299143 A1* | 12/2011 | Alessi | ...................... | H04N 1/60 |
| | | | | 358/504 |
| 2011/0317149 A1* | 12/2011 | Shimbo | ................... | G01J 3/462 |
| | | | | 356/72 |
| 2014/0226158 A1* | 8/2014 | Trainer | ................... | G02B 6/32 |
| | | | | 356/336 |
| 2015/0168184 A1* | 6/2015 | Schweid | ................... | G01J 3/28 |
| | | | | 702/85 |

* cited by examiner

DEVICE CALIBRATION USING AUGMENTED DATA WITH HADAMARD VARIATION

The present disclosure relates generally to calibrating a device to a known reference and, more particularly, to a method and an apparatus for re-calibrating a device using augmented data.

BACKGROUND

In many applications it is necessary to calibrate a device to a known reference. For example, color characterization could be performed using an off-line spectrophotometer. The off-line device would measure patches on a device to be color corrected and an algorithm was executed that produced a color correction for the device. However, this process was highly resource intensive and required the operator to print a test target, measure it off-line and load the calculated correction on the device.

In order to simplify the process an in-line spectrophotometer (ILS) was inserted into the printer path for some machines. In order to maintain the color accuracy of the color profiling system the ILS needed to be modified to emulate the reference device that it is supplanting. This calibration was accomplished using a 31×31 conversion matrix that estimates the 31 spectral values of the reference device from the spectral measurements of the machine device.

One technique for generating the matrix is an empirical solution that uses a pseudo-inverse technique. Unfortunately, the inversion technique does not work well for the ILS characterization problem. The matrix for the ILS problem is ill-conditioned and the inverse is not stable. Adding a small amount of noise to either the ILS spectral data or the reference device data will result in drastically different values for the matrix. The cause of the numerical instability is that all colors are created through weighted combinations of cyan, magenta, yellow and black (CMYK), so in reality there are only about 7 degrees of freedom in determining the varying spectral of the ILS and reference device. In order to get more degrees of freedom more unique inks are needed. Unfortunately, it is not possible to circumvent this limitation by increasing the number of patches measured as they are all constrained to vary in the seven degrees of freedom.

SUMMARY

According to aspects illustrated herein, there are provided a method, a non-transitory computer readable medium, and an apparatus for calibrating a device using augmented data. One disclosed feature of the embodiments is a method that measures k spectral values of each patch for a first plurality of patches generated by the device and a second plurality of patches generated by the reference device, creates a first augmented data set by selecting a delta ($\delta$), wherein the first augmented data set comprises the $\delta$ applied k times to each one of the k spectral values of each one of the first plurality of patches, initializes initializing a function to create a second augmented data set for the reference device, wherein the second augmented data set comprises the $\delta$ times a gain applied k times to each one of the k spectral values of each one of the second plurality of patches and a matrix of calibration values that is based upon the first augmented data set and the second augmented data set, solves the function to obtain a matrix of calibration values of the device that is based upon the first augmented data set and the second augmented data set and calibrates the device using the matrix of calibration values.

Another disclosed feature of the embodiments is a non-transitory computer-readable medium having stored thereon a plurality of instructions, the plurality of instructions including instructions which, when executed by a processor, cause the processor to perform an operation that measures k spectral values of each patch for a first plurality of patches generated by the device and a second plurality of patches generated by the reference device, creates a first augmented data set by selecting a delta ($\delta$), wherein the first augmented data set comprises the $\delta$ applied k times to each one of the k spectral values of each one of the first plurality of patches, initializes initializing a function to create a second augmented data set for the reference device, wherein the second augmented data set comprises the $\delta$ times a gain applied k times to each one of the k spectral values of each one of the second plurality of patches and a matrix of calibration values that is based upon the first augmented data set and the second augmented data set, solves the function to obtain a matrix of calibration values of the device that is based upon the first augmented data set and the second augmented data set and calibrates the device using the matrix of calibration values.

Another disclosed feature of the embodiments is an apparatus comprising a processor and a computer readable medium storing a plurality of instructions which, when executed by the processor, cause the processor to perform an operation that measures k spectral values of each patch for a first plurality of patches generated by the device and a second plurality of patches generated by the reference device, creates a first augmented data set by selecting a delta ($\delta$), wherein the first augmented data set comprises the $\delta$ applied k times to each one of the k spectral values of each one of the first plurality of patches, initializes initializing a function to create a second augmented data set for the reference device, wherein the second augmented data set comprises the $\delta$ times a gain applied k times to each one of the k spectral values of each one of the second plurality of patches and a matrix of calibration values that is based upon the first augmented data set and the second augmented data set, solves the function to obtain a matrix of calibration values of the device that is based upon the first augmented data set and the second augmented data set and calibrates the device using the matrix of calibration values.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for calibrating a device using augmented data. As discussed above, various methods are used for calibrating a device to a reference device. For example, color may be calibrated in a multi-function device (MFD) (e.g., a printer) to a reference MFD to maintain color consistency. Currently used methods for calibration are either off-line or are not stable given only the data set of each patch generated by the device and the reference device.

One embodiment of the present disclosure resolves the stability issues for the pseudo-inverse techniques. In one embodiment, the present disclosure creates augmented data sets to perform a minimum mean square error calculation using a matrix inversion. In one embodiment, the calculation may be performed using an iterative process that converges on a matrix of calibration values that may be applied to all devices that need to be calibrated. In other words, the present disclosure provides a solution that may be applied to all patches of a device and a reference device and not just to a single patch of the device, while creating large errors when applied to other patches of the device.

Figure 1:
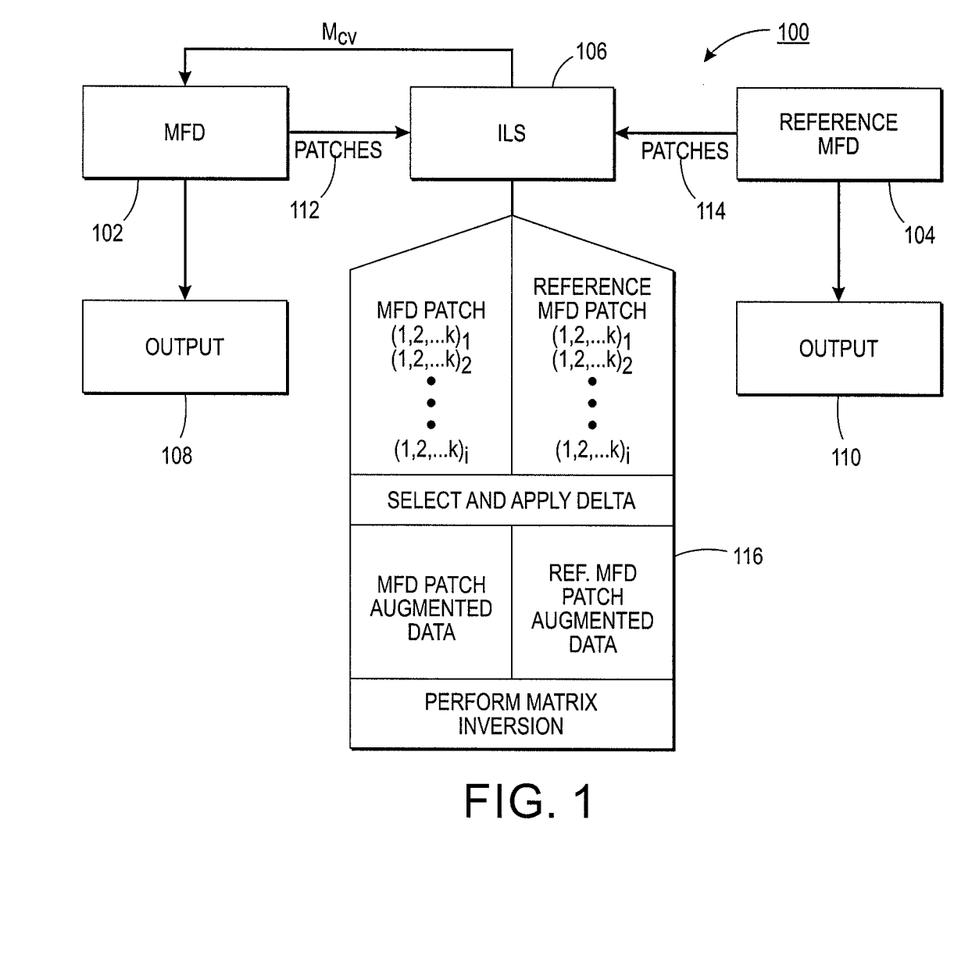
FIG. 1 illustrates an system for calibrating a device using augmented data.

FIG. 1 illustrates an example system 100 that performs the calibration using augmented data. In one embodiment, the system 100 may include a multi-function device (MFD) 102 that is being calibrated to a reference MFD 104. In one embodiment, the MFD may be a printer, a copy machine, a fax machine, a printer/fax/copy machine, or any other device capable of producing an image. In one embodiment, the MFD 102 and the reference MFD 104 may include a processor and a computer readable memory similar to the general purpose computer 300 described below and illustrated in FIG. 3.

In one embodiment, the MFD 102 may produce an output 108 that is being calibrated to match an output 110 of the reference MFD. In one embodiment, the calibration may be to match the color of the output 108 (e.g., a color image) to the output 110 (e.g., a reference color image).

In one embodiment, an inline spectrophotometer (ILS) 106 may be deployed to perform the calibration in-line. The ILS 106 may include a processor and a computer readable memory similar to the general purpose computer 300 described below and illustrated in FIG. 3.

In one embodiment, the MFD 102 and the reference MFD 104 may provide a plurality of patches 112 and 114, respectively, to the ILS 106. In one embodiment, the ILS 106 may process the plurality of patches 112 and 114 as illustrated in box 116 to calculate a matrix of conversion values ($M_{CV}$) that is fed back to the MFD 102 to calibrate the MFD 102 to produce an output 108 that matches the output 110 of reference MFD 104.

As illustrated in the box 116, the ILS 106 may receive the plurality of patches 112 and 114 from the MFD 102 and the reference MFD 104, respectively, that include 1 to i patches each having 1 to k spectral values. For example, in one embodiment the calibration may be for color having 31 (e.g., k=31) spectral values. The calibration may be performed using a matrix of 31×31 calibration values.

Typically, the matrix is calculated using a matrix inversion technique. In most scenarios the matrix inversion technique works well where the number of data samples is greater than the number of inputs and outputs. For example, in the case of 31 spectral values it would be expected that a patch set size of 150 or more from the MFD 102 and reference MFD 104 to be sufficient for the inversion.

However, in the case of ILS calibration problem, the inversion is not stable. The inversion may depend on the patches from the MFD 102 spanning the entire space of 31 spectral values. However, in currently used methods, the patches do not span the entire space of 31 spectral values and a small amount of noise may result in drastically different values for the matrix. As a result, the matrix may be only suitable for the spectral values of the patch that was used to create the matrix.

The cause of the numerical instability may be due to the fact that all colors are created through weighted combination of CMYK, so in reality there are only about 7 degrees of freedom in determining the varying spectra of the MFD 102 and the reference MFD 104. In order to get more degrees of freedom more unique inks are needed and creating more patches does not resolve this problem.

One embodiment of the present disclosure resolves the instability by creating an augmented data set and using the augmented data set to perform the matrix inversion. The matrix inversion may be performed using an iterative process to converge the matrix to the matrix of calibration values, $M_{CV}$. In one embodiment, augmented data may be created for the MFD 102 and the reference MFD 104 to ensure that the patches of generated by the MFD 102 span the full space of 31 spectral values and not just a subset of it. The augmented data sets are purely mathematical and no additional measurements are necessary to create the augmented data sets.

As illustrated in the box 116, a delta ($\delta$) may be selected and applied to the first plurality of patches 112 from the MFD 102 and the second plurality of patches 114 from the reference MFD 104. In one embodiment, the $\delta$ may be selected by applying a cost function to calculate the optimal value of a calibration application that relies on a single variable. For example, in one embodiment, of the present disclosure the single variable may be $\delta$.

In one embodiment, the cost function may be a function of a fit error plus a regularization weighting parameter ($\lambda$) times a regularization cost. The cost function may either increase the fit error while decreasing the regularization cost or decreasing the fit error while increasing the regularization cost.

In one embodiment, the cost function may comprise a machine learning cost function of delta ($J(\delta)$). The machine learning cost function ($J(\delta)$) may be represented by Equation (1) below:

$$J(\delta) = \|\text{ISIS\_training\_spectra} - M^*\text{ILS\_training\_spectra}\|_F / E_{norm} + \lambda \|M - g^*I\|_F, \quad \text{Eq. (1)}$$

wherein the function $\| \ \|_F$ is a Frobenius norm of a matrix, ISIS_training_spectra are spectral values of a training data set of the reference device, M is a calibration matrix (e.g., a matrix of calibration values described herein), ILS_training_spectra are spectral values of a training data set of the device being calibrated, $E_{norm}$ is a norm of an uncorrected device error represented as $\|\text{ISIS\_training\_spectra} - \text{ILS\_training\_spectra}\|_F$, g is an optional normalization term equal to a nominal gain between the training data set of the reference device and the training data set of the device to be calibrated and I is the identity matrix, wherein the fit error is represented by $\|\text{ISIS\_training\_spectra} - M^*\text{ILS\_training\_spectra}\|_F / E_{norm}$ and the regularization cost is represented by $\|M - g^*I\|_F$.

In one embodiment, the optimal value for $\delta$ may comprise a minimum of the machine learning cost function of Equation (1) over a range of values for $\lambda$. In one example, using ranges of $\lambda$ from 3 to 30 shows that the machine learning cost function has a common minimum that occurs around $-1.25 < \log(\delta) < 0.5$. Notably, the optimal solution may not be sensitive to $\lambda$. Thus, in one example, any value of $\log(\delta)$ between −1.25 and 0.5 may provide a robust and well performing matrix of calibration values or characterization matrix.

In another embodiment, the cost function may comprise a rate distortion cost function of delta (J(δ)). The rate distortion cost function may be similar to a compression optimization in the form of J=D+λ*R, wherein D is a measure of distortion (e.g., signal to noise ratio (SNR)) and R is a measure of rate in bits.

In one embodiment, the distortion used in compression techniques may be translated for the calibration problem as the difference in the spectral values of the patch from the reference MFD 104 and the corresponding spectral values of the corresponding patch from the MFD 102. This may be presented as a logarithmic function for the color calibration problem.

Notably, there are no "bits" in color calibration as defined in the compression techniques (e.g., zeros and ones). However, one embodiment of the present disclosure correlates the "bits" to the single variable δ. As the value of δ approaches 0 the original data is maintained perfectly (corresponding to infinite bits) and as the value of δ approaches infinity, the original data is completely lost (corresponding to 0 bits). This value may also be presented as a logarithmic function for the color calibration problem. Given the non-obvious translations above, the rate distortion cost function (J(δ)) may be represented by Equation (2) below:

$$J(\delta) = \log(\|ISIS\_training\_spectra - M^* ILS\_training\_spectra\|_F) + \lambda^*(-\log \delta), \quad \text{Eq. (2)}$$

wherein the function $\| \|_F$ is a Frobenius norm of a matrix, ISIS_training_spectra are spectral values of a training data set of the reference device, M is a calibration matrix (e.g., a matrix of calibration values described herein), ILS_training_spectra are spectral values of a training data set of the device being calibrated, wherein the fit error is equivalent to a distortion represented by log ($\|ISIS\_training\_spectra - M^*ILS\_training\_spectra\|_F$) and the regularization cost is equivalent to a rate represented by (−log δ).

In one embodiment, the optimal value for δ may comprise a minimum of the rate distortion cost function of Equation (2) over a range of values for λ. In one example, using ranges of λ from 0.1 to 0.3 shows that the rate distortion cost function has a common minimum that occurs around 0.5<log(δ)<2.0. Notably, the optimal solution may not be sensitive to λ. Thus, in one example, any value of δ between 0.5 and 2 may provide a robust and well performing matrix of calibration values or characterization matrix.

Once the optimal value for δ is selected using one of the cost functions described above, the δ may be applied k times to each of the k spectral values of each one of the i patches generated by the MFD 102 and the reference MFD 104.

In one embodiment, the first augmented data set for the MFD 102 being calibrated may be created using the following Equation (3):

$$ILS\_spectra(i,j) = ILS\_spectra(i) + \delta^* H(j) \quad (1 \leq j \leq k), \quad \text{Eq. (3)}$$

wherein ILS_spectra(i) is the ith patch of the MFD 102, ILS_spectra(i,j) is the jth augmented data vector generated from the ILS_spectra(i), and H(j) is the jth basis vector of a Hadamard matrix;

In one embodiment, any orthonormal matrix that completely spans the k spectral values may be used. The orthonormal matrix may determine whether the δ is added or subtracted to a corresponding spectral value in a 31×31 matrix. In one embodiment, the orthonormal matrix may be the Hadamard matrix as used in Equation (3).

In one embodiment, the first augmented data set may be set as a constant and used in each iteration of a function for a solution to finding $M_{CV}$. In one embodiment, the $M_{CV}$ may be calculated based on an equation used to generate a second augmented data set for the reference MFD 104 crated using the following Equation (4):

$$ISIS\_spectra(i,j) = ISIS\_spectra(i) + \delta^* M_{CV}^* H(j) \quad (1 \leq j \leq k) \quad \text{Eq. (4)}$$

wherein ISIS_spectra(i) is the ith patch of the reference MFD 104, ISIS_spectra(i,j) is the jth augmented data vector generated from the ISIS_spectra(i).

In one embodiment, $M_{CV}$ may represent the matrix that calibrates the spectral values of each path for the MFD 102 to the reference MFD 104 according to Equation (5):

$$ISIS\_spectra(i,j) = M_{CV}^* ILS\_spectra(i,j) \quad \text{Eq. (5)}$$

For example, the first augmented data set ILS_spectra (i,j) for the MFD 102 and the second augmented data set ISIS_spectra (i,j) for the reference MFD 102 may be used to calculate the matrix of calibration values, $M_{CV}$ using a pseudo-inversion technique that solves a minimum mean square error (MMSE) fit problem using Equation (6):

$$M_{CV} = ISIS\_spectra(i,j)^* pinv(ILS\_spectra(i,j)) \quad \text{Eq. (6)}$$

where $pinv(X) = X^T(XX^T)^{-1}$.

It is recognized that Equation (4) includes $M_{CV}$ that requires the second augmented data set ISIS_spectra(i,j) in order to calculate the second augmented data set ISIS_spectra(i,j). However, in one embodiment, Equation (4) may be solved using an iterative process that converges to a solution for $M_{CV}$. In one embodiment, the identity matrix (I) may be used as an initial guess for $M_{CV}$ using a-priori knowledge that the matrix of conversion values is nearly identity to initialize the Equation (4). In other words, it is assumed that the MFD 102 and the reference MFD 104 are extremely similar with slightly different operating environments. Therefore, if δ is small, Equation (4) may be approximated by Equation (7):

$$ISIS\_spectra(i,j) = ISIS\_spectra(i) + g^* \delta^* I^* H(j) \quad (1 \leq j \leq k), \quad \text{Eq. (7)}$$

wherein g is a gain comprising a standard deviation of a reference device spectrum divided by a standard deviation of the device spectrum and I is the identity matrix. In one embodiment, the gain g may be optional and may be set to 1 if calculation time is paramount.

In one embodiment, using Equation (7) as a starting point that initializes Equation (4), an iterative process may be applied to Equation (7) to update I to an intermediate matrix that is calculated. The iterative process may be repeated using a weighted average of the intermediate matrix that is previously calculated and the identity matrix I according to Equation (8):

$$ISIS\_spectra(i,j) = ISIS\_spectra(i) + \delta^* [a^* M_{prev} + (1-a)^* g^* I] ^* H(j) \quad (1 \leq j \leq k), \quad \text{Eq. (8)}$$

wherein a is a constant weighting factor that determines how much a previous iteration changes a next set of spectra and $M_{prev}$ is a previous matrix result from the previous iteration.

Equation (8) may be repeated until the Equation (8) converges on a solution for $M_{CV}$. In one embodiment, the matrix of calibration values $M_{CV}$ may then be transmitted back to the MFD 102 to calibrate the spectral values of the MFD 102 as illustrated in FIG. 1. In one embodiment, the process may be repeated by the ILS 106 for a plurality of MFDs that are manufactured to ensure that each manufactured MFD is calibrated to the reference MFD 104.

It should be noted that although a multi-function device for calibrating colors was used as an example to illustrate the calibration process of the present disclosure, that the present disclosure may be applied to calibration of any device. For example, the present process may be applied to any calibration dependent on a single variable.

Figure 2:
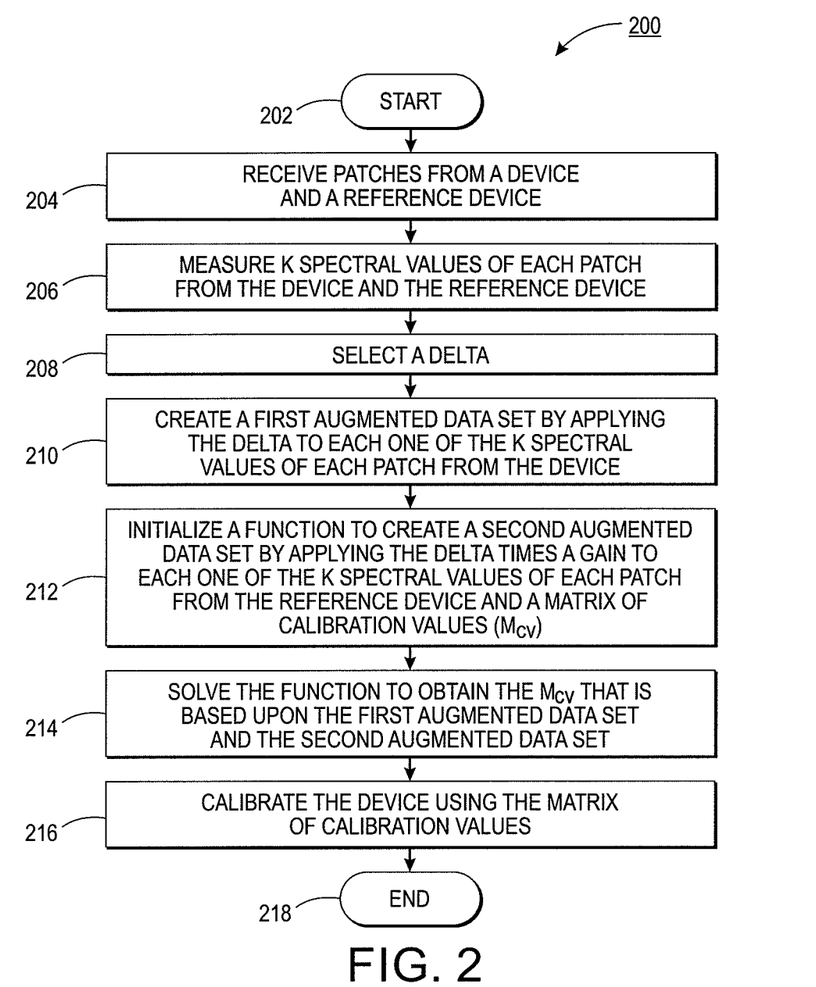
FIG. 2 illustrates an example flowchart of a method for calibrating a device using augmented data.
Figure 3:
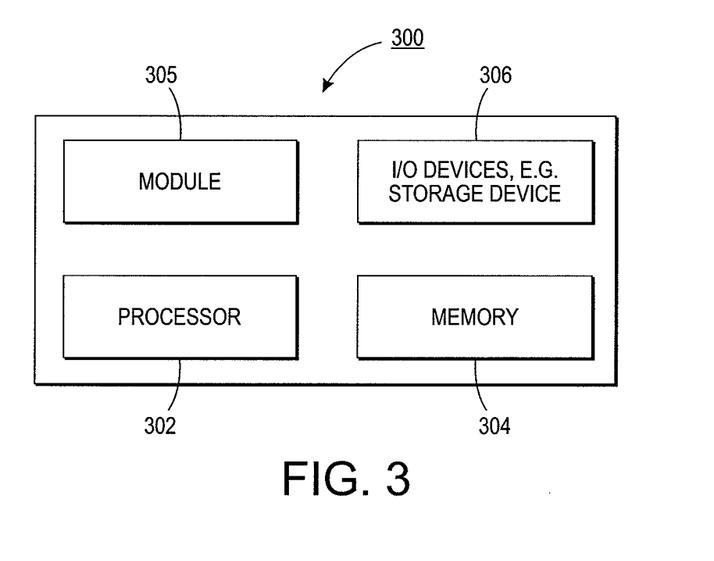
FIG. 3 illustrates a high-level block diagram of a general-purpose computer suitable for use in performing the functions described herein.

FIG. 2 illustrates a flowchart of a method 200 for calibrating a device using augmented data. In one embodiment, one or more steps or operations of the method 200 may be performed by the ILS 106 or a general-purpose computer 200 as illustrated in FIG. 3 and discussed below.

The method 200 begins at step 202. At step 204, the method 200 receives patches from a device and a reference device. For example, the device that is being calibrated may generate a first plurality of patches with each one of the first plurality of patches. The reference device may generate a second plurality of patches with each one of the second plurality of patches.

At step 206, the method 200 measures k spectral values of each patch from the device and the reference device. For example, each one of the first plurality of patches generated by the device being calibrated and each one of the second plurality of patches generated by the reference device may be measured or analyzed to obtain k spectral values of each one of the first plurality of patches and each one of the second plurality of patches. In one embodiment, k may be equal to 31.

At step 208, the method 200 selects a delta. In one embodiment, an optimal value of δ may be selected to generate augmented data and calculate a matrix of calibration values for the device being calibrated. In one embodiment, the δ may be selected using a cost function and finding a minimum of the cost function across a range of different regularization weighting parameter values λ. In one embodiment, the cost function may be a machine learning cost function described above in Equation (1). In another embodiment, the cost function may be a rate distortion cost function described above in Equation (2).

At step 210, the method 200 creates a first augmented data set by applying the delta k times to each one of the k spectral values of each patch from the device. For example, the first augmented data set may include an augmented data set for each of k spectral values for each one of the first plurality of patches. For example, if there are 50 patches generated by the device being calibrated and each patch has 31 spectral values, the first augmented data set would be comprised of the original 50 patches and 1550 augmented patches; the 1550 augmented patches resulting from each original patch spawning a set of 31 augmented patches. For example, the first data patch would spawn 31 augmented patches, the second patch would spawn 31 augmented patches, and so forth up to the 50$^{th}$ patch having 31 augmented patches. In one embodiment, Equation (3) described above may be used to calculate the first augmented data set.

At step 212, the method 200 initializes a function to create a second augmented data set for the reference device, wherein the second augmented data set comprises the delta times a gain applied k times to each one of the k spectral values of each one of the second plurality of patches and a matrix of calibration values that is based upon the first augmented data set and the second augmented data set. In one embodiment, the gain may be defined as a standard deviation of a reference device spectrum divided by a standard deviation of the device spectrum.

In one embodiment, the function may be Equation (4) described above. In one embodiment, first augmented data set may be used as a constant in Equation (6), describe above, to substitute $M_{CV}$ as a function of the second augmented data set so that Equation (4) may be solved using an iterative process.

At step 214, the method 200 solves the function to obtain a matrix of calibration values for the device that is based upon the first augmented data set and the second augmented data set. As can be seen by Equation (4), the generation of the second augmented data set requires the matrix of calibration values that is being calculated that also depends on the second augmented data set. Thus, Equation (4) may be solved using an iterative process that converges to the solution for the matrix of calibration values starting with Equation (7), described above, as an initial guess and updating the intermediate matrix with Equation (8), described above, until the iterations converges to the matrix of calibration values.

At step 216, the method 200 calibrates the device using the matrix of calibration values. For example, the matrix of calibration values may be provided to the device being calibrated and the device may apply the matrix of calibration values to the k spectral values of the device to adjust the color output to match the color output of the reference device. In one embodiment, the method 200 may be applied to all devices being calibrated and to any patch generated by the device being calibrated. Unlike previous methods, the augmented data set ensures that the solution spans all k spectral values of the device. As a result, a stable solution is provided that does not create large errors for small changes.

At step 218, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for calibrating a device using augmented data, and various input/output devices 306 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 305 for calibrating a device using augmented data can be loaded into memory 304 and executed by processor 302 to implement the functions as discussed above. As such, the present method 305 for calibrating a device to a reference device using augmented data (including associated data structures) of the present disclosure can be stored on a non-transitory (e.g., physical and tangible) computer readable storage medium, e.g., RAM memory, magnetic or optical drive or diskette and the like. For example, the hardware processor 302 can be programmed or configured with instructions (e.g., computer readable instructions) to perform the steps, functions, or operations of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for calibrating a device to a reference device using augmented data, comprising
    measuring, by a processor, k spectral values of each patch for a first plurality of patches generated by the device and a second plurality of patches generated by the reference device, wherein k is a number of spectral values;
    creating, by the processor, a first augmented data set for the device by selecting a delta (δ), wherein the delta comprises a value derived from a cost function, wherein the first augmented data set comprises the δ applied k times to each one of the k spectral values of each one of the first plurality of patches;
    initializing, by the processor, a function to create a second augmented data set for the reference device, wherein the second augmented data set comprises the δ times a gain applied k times to each one of the k spectral values of each one of the second plurality of patches and a matrix of calibration values that is based upon the first augmented data set and the second augmented data set;
    solving, by the processor, the function to obtain the matrix of calibration values for the device that is based upon the first augmented data set and the second augmented data set; and
    calibrating, by the processor, the device using the matrix of calibration values.

2. The method of claim 1, wherein the processor is in an in-line spectrophotometer (ILS) of the device.

3. The method of claim 1, wherein the δ is applied k times to each one of the k spectral values of each one of the first plurality of patches and the second plurality of patches using an orthonormal matrix that completely spans the k spectral values, wherein each vector of the orthonormal matrix determines whether the δ is added or subtracted.

4. The method of claim 3, wherein the orthonormal matrix comprises a Hadamard matrix.

5. The method of claim 1, wherein the gain comprises a standard deviation of a reference device spectrum divided by a standard deviation of a device spectrum.

6. The method of claim 1, wherein the solving comprises an iterative calculation comprising an initial guess using an identity matrix.

7. The method of claim 6, wherein the iterative calculation comprises a previous matrix that is calculated for each subsequent iteration after the initial guess.

8. The method of claim 7, wherein the each subsequent iteration comprises the previous matrix and the identity matrix weighted by a weighting factor.

9. The method of claim 6, wherein the iterative calculation is repeated until the calculating converges to values of the matrix of calibration values.

10. A non-transitory computer-readable medium storing a plurality of instructions which, when executed by a processor, cause the processor to perform operations for calibrating a device to a reference device using augmented data, the operations comprising:
    measuring k spectral values of each patch for a first plurality of patches generated by the device and a second plurality of patches generated by the reference device, wherein k is a number of spectral values;
    creating a first augmented data set for the device by selecting a delta (δ), wherein the delta comprises a value derived from a cost function, wherein the first augmented data set comprises the δ applied k times to each one of the k spectral values of each one of the first plurality of patches;
    initializing a function to create a second augmented data set for the reference device, wherein the second augmented data set comprises the δ times a gain applied k times to each one of the k spectral values of each one of the second plurality of patches and a matrix of calibration values that is based upon the first augmented data set and the second augmented data set;
    solving the function to obtain the matrix of calibration values for the device that is based upon the first augmented data set and the second augmented data set; and
    calibrating the device using the matrix of calibration values.

11. The non-transitory computer-readable medium of claim 10, wherein the processor is in an in-line spectrophotometer (ILS) of the device.

12. The non-transitory computer-readable medium of claim 10, wherein the δ is applied k times to each one of the k spectral values of each one of the first plurality of patches and the second plurality of patches using an orthonormal matrix that completely spans the k spectral values, wherein each vector of the orthonormal matrix determines whether the δ is added or subtracted.

13. The non-transitory computer-readable medium of claim 12, wherein the orthonormal matrix comprises a Hadamard matrix.

14. The non-transitory computer-readable medium of claim 10, wherein the gain comprises a standard deviation of a reference device spectrum divided by a standard deviation of a device spectrum.

15. The non-transitory computer-readable medium of claim 10, wherein the solving comprises an iterative calculation comprising an initial guess using an identity matrix.

16. The non-transitory computer-readable medium of claim 15, wherein the iterative calculation comprises a previous matrix that is calculated for each subsequent iteration after the initial guess.

17. The non-transitory computer-readable medium of claim 16, wherein the each subsequent iteration comprises the previous matrix and the identity matrix weighted by a weighting factor.

18. The non-transitory computer-readable medium of claim 15, wherein the iterative calculation is repeated until the calculating converges to values of the matrix.

19. A method for calibrating a device to a reference device using augmented data, comprising:
    measuring, by a processor, k spectral values of each patch for a first plurality of patches generated by the device and a second plurality of patches generated by the reference device, wherein k is a number of spectral values;

creating, by the processor, the first augmented data set by selecting a delta (δ), wherein the delta comprises a value derived from a cost function, wherein the first augmented data set comprises the δ applied k times to each one of the k spectral values of each one of the first plurality of patches;

initializing, by the processor, a function to create a second augmented data set for the reference device, wherein the second augmented data set comprises the δ times a gain applied k times to each one of the k spectral values of each one of the second plurality of patches and a matrix of calibration values that is based upon the first augmented data set and the second augmented data set;

providing, by the processor, an initial guess for calculating the matrix of calibration values of the device set using an identity matrix according to an equation, $$\text{ISIS\_spectra}(i,j) = \text{ISIS\_spectra}(i) + g * \delta * I * H(j) (1 \leq j \leq k),$$

wherein ISIS_spectra(i) is the ith patch of the reference device, ISIS_spectra(i,j) is the jth augmented data vector generated from the ISIS_spectra(i), g is a gain comprising a standard deviation of a reference device spectrum divided by a standard deviation of the device spectrum, I is the identity matrix and H(j) is the jth basis vector of a Hadamard matrix;

solving, by the processor, the equation via an iterative process using an intermediate matrix obtained from the initial guess and each previous matrix using a second equation until the second equation converges on a solution of the matrix of calibration values, wherein the second equation comprises, $$\text{ISIS\_spectra}(i,j) = \text{ISIS\_spectra}(i) + \delta * [a * M_{prev} + (1-a) * g * I] * H(j) (1 \leq j \leq k),$$

wherein a is a constant weighting factor that determines how much a previous iteration changes a next set of spectra and $M_{prev}$ is a previous matrix that results from the previous iteration; and calibrating, by the processor, the device using the matrix of calibration values.

20. The method of claim 19, wherein the processor is in an in-line spectrophotometer (ILS) of the device.

\* \* \* \* \*